US011762060B2

(12) United States Patent
Zhang et al.

(10) Patent No.: US 11,762,060 B2
(45) Date of Patent: Sep. 19, 2023

(54) HEIGHT-ESTIMATION OF OBJECTS USING RADAR

(71) Applicant: Aptiv Technologies Limited, St. Michael (BB)

(72) Inventors: Yihang Zhang, Los Angeles, CA (US); Narbik Manukian, Los Angeles, CA (US)

(73) Assignee: Aptiv Technologies Limited, St. Michael (BB)

( * ) Notice: Subject to any disclaimer, the term of this patent is extended or adjusted under 35 U.S.C. 154(b) by 293 days.

(21) Appl. No.: 17/005,278

(22) Filed: Aug. 27, 2020

(65) Prior Publication Data

US 2022/0065991 A1  Mar. 3, 2022

(51) Int. Cl.
*G01S 7/41* (2006.01)
*G01S 13/42* (2006.01)
(Continued)

(52) U.S. Cl.
CPC .............. *G01S 7/412* (2013.01); *G01S 13/42* (2013.01); *G01S 13/52* (2013.01); *G01S 13/931* (2013.01);
(Continued)

(58) Field of Classification Search
CPC .......... G01S 7/412; G01S 13/42; G01S 13/52; G01S 13/931; G01S 2013/93273;
(Continued)

(56) References Cited

U.S. PATENT DOCUMENTS

| 6,404,328 B1 | 6/2002 | Alland et al. |
| 6,556,166 B1 | 4/2003 | Searcy et al. |

(Continued)

FOREIGN PATENT DOCUMENTS

| EP | 1736797 | 12/2006 |
| EP | 3156817 | 1/2019 |
| JP | 2014006071 | 1/2014 |

OTHER PUBLICATIONS

Title = {Height estimation for automotive MIMO radar with group-sparse reconstruction}, publisher = {arXiv}, author = {Simoni, Renato and Mateos-Núñez, David and González-Huici, María A. and Correas-Serrano, Aitor} (Year: 2019).*

(Continued)

*Primary Examiner* — Timothy A Brainard
*Assistant Examiner* — Ismaaeel A. Siddiquee
(74) *Attorney, Agent, or Firm* — Sawtooth Patent Group PLLC

(57) ABSTRACT

Techniques and apparatuses are described that implement height-estimation of objects using radar. In particular, a radar system, which is mounted to a moving platform, receives reflection signals that represent versions of a radar signal that are reflected off of objects. The radar system generates a range-elevation map based on raw data from the reflection signals, identifies an elevation bin and a range bin in the range-elevation map that corresponds to a selected object, and calculates a height for the selected object based on the range and elevation bins. The radar system then calculates a de-noised height for the selected object based on one or more previously calculated heights for the selected object. In this way, the radar system can determine accurate heights of objects at sufficiently long ranges for evasive action.

20 Claims, 6 Drawing Sheets

(51) Int. Cl.
  *G01S 13/52* (2006.01)
  *G01S 13/931* (2020.01)
  *G01S 13/937* (2020.01)
  *G01S 13/93* (2020.01)
  *G01S 13/933* (2020.01)

(52) U.S. Cl.
  CPC .............. *G01S 7/415* (2013.01); *G01S 13/93* (2013.01); *G01S 13/933* (2020.01); *G01S 13/937* (2020.01); *G01S 2013/93273* (2020.01)

(58) Field of Classification Search
  CPC ........ G01S 7/415; G01S 13/93; G01S 13/933; G01S 13/937
  See application file for complete search history.

(56) References Cited

U.S. PATENT DOCUMENTS

| | | | |
|---|---|---|---|
| 7,592,945 B2 | 9/2009 | Colburn et al. | |
| 7,633,429 B1* | 12/2009 | Liu | G01S 13/4445 |
| | | | 342/107 |
| 9,297,892 B2 | 3/2016 | Smith et al. | |
| 9,541,639 B2 | 1/2017 | Searcy et al. | |
| 9,568,600 B2 | 2/2017 | Alland | |
| 10,114,106 B2 | 10/2018 | Schiffmann et al. | |
| 10,417,508 B2 | 9/2019 | Wei et al. | |
| 2003/0076255 A1* | 4/2003 | Ono | G01S 13/34 |
| | | | 342/72 |
| 2005/0033516 A1 | 2/2005 | Kawasaki | |
| 2008/0189039 A1 | 8/2008 | Sadekar et al. | |
| 2009/0002222 A1 | 1/2009 | Colburn et al. | |
| 2015/0116164 A1* | 4/2015 | Mannion | G01R 31/001 |
| | | | 343/703 |
| 2015/0298621 A1* | 10/2015 | Katoh | B60R 11/04 |
| | | | 348/148 |
| 2016/0245911 A1* | 8/2016 | Wang | G01S 7/2927 |
| 2017/0162056 A1 | 6/2017 | Feyerabend et al. | |
| 2017/0185089 A1 | 6/2017 | Mei et al. | |
| 2018/0011172 A1 | 1/2018 | Cashler et al. | |
| 2018/0342160 A1* | 11/2018 | Komori | B60T 8/171 |
| 2018/0356511 A1* | 12/2018 | Buddendick | G01S 13/32 |
| 2019/0016315 A1 | 1/2019 | Prasad | |
| 2019/0279366 A1 | 9/2019 | Sick et al. | |
| 2021/0190904 A1* | 6/2021 | Bourdoux | G01S 13/89 |
| 2021/0241026 A1* | 8/2021 | Deng | G01S 7/41 |

OTHER PUBLICATIONS

"Extended European Search Report", EP Application No. 21190428.9, dated Jan. 24, 2022, 9 pages.

Simoni, et al., "Height estimation for automotive MIMO radar with group-sparse reconstruction", Apr. 22, 2019, 11 pages.

* cited by examiner

HEIGHT-ESTIMATION OF OBJECTS USING RADAR

BACKGROUND

Radars are useful devices that can detect and track objects. Relative to other types of sensors, like a camera, a radar can provide improved performance in the presence of different environmental conditions, such as low lighting and fog, or with overlapping objects. Accordingly, radar provides many advantages for autonomous-driving applications or driver-assistance applications.

Specifically, height-estimation of objects in front of a vehicle is essential in determining if the objects are at ground level, and thus may need to be avoided, or if the objects may be safely traveled under. Traditional radar systems are unable to accurately determine height-estimation of objects at sufficient ranges to enable a vehicle to take evasive action if necessary.

SUMMARY

Techniques and apparatuses are described that implement height-estimation of objects using radar. In particular, a radar system, that is mounted to a moving platform receives reflection signals that represent versions of a radar signal that are reflected off of objects. The radar system generates a range-elevation map based on raw data from the reflection signals, identifies an elevation bin and a range bin in the range-elevation map that corresponds to an object, and calculates a height for the object based on the range and elevation bins. The radar system then applies a de-noising filter on the calculated height and one or more previously calculated heights for the object to determine a de-noised height of the object. In this way, the radar system can determine accurate heights of objects at sufficiently long ranges for evasive action.

Aspects described below include a method performed by a radar system that is mounted to a mobile platform. The method includes the radar system transmitting at least one radar signal and receiving reflection signals representing versions of the at least one radar signal that have been reflected by one or more objects. The method also includes generating, by multiple receive channels of the radar system, raw data representing time-domain samples of the reflection signals and generating, by a height-estimation module of the radar system, a range-elevation map based on the raw data. The range-elevation map comprising complex numbers for a set of range bins and a set of elevation bins. The method further includes identifying, within the range-elevation map, an elevation bin of the elevation bins and a range bin of the range bins that are associated with an object of the objects, determining, by the height-estimation module, a measured height of the object based on the elevation bin and the range bin, and calculating a de-noised height of the object based on the measured height of the object and one or more previously measured heights of the object.

Aspects described below also include a radar system with an array of receive antennas and a transceiver coupled to the array of receive antennas, and a processor coupled to the transceiver. The transceiver is configured to receive reflection signals from the array of receive antennas representing versions of a radar signal that have been reflected by one or more objects. The processor is configured to generate from multiple receive channels of the radar system corresponding to respective receive antennas of the array of receive antennas, raw data representing time-domain samples of the reflection signals. The processor is also configured to generate a range-elevation map based on the raw data, the range-elevation map comprising complex numbers for a set of range bins and a set of elevation bins. The processor is further configured to identify, within the range-elevation map, an elevation bin of the elevation bins and a range bin of the range bins that are associated with an object of the objects and determine a measured height of the object based on the elevation bin and the range bin. After determining the measured height of the object, the processor is configured to calculate a denoised height of the object based on the measured height of the object and one or more previously measured heights of the object.

Aspects described below also include at least one non-transitory computer-readable storage media device comprising computer-executable instructions that, responsive to execution by at least one processor, implement: a height-estimation module. The height-estimation module is configured to receive, from multiple receive channels of a radar system, raw data representing time-domain samples of reflection signals representing versions of a radar signal that have been reflected by one or more objects. The height-estimation module is configured to then generate a range-elevation map comprising complex numbers for a set of range bins and a set of elevation bins based on the raw data and identify an elevation bin of the elevation bins and a range bin of the range bins that are associated with an object of the objects. The height-estimation module is further configured to determine a measured height of the object based on the elevation bin and the range bin and calculate a denoised height of the object based on the measured height of the object and one or more previously measured heights of the object.

Aspects described below also include a system with means for performing height-estimation of objects using radar.

This summary is provided to introduce simplified concepts for performing height-estimation of objects using radar, which are further described below in the Detailed Description and Drawings. For ease of description, the disclosure focuses on automotive radar systems; however, the techniques are not limited to automobiles. The techniques also apply to radars of other types of vehicles, systems, and moving platforms. This summary is not intended to identify essential features of the claimed subject matter, nor is it intended for use in determining the scope of the claimed subject matter.

BRIEF DESCRIPTION OF THE DRAWINGS

The details of one or more aspects of height-estimation of objects using radar are described in this document with reference to the following figures. The same numbers are used throughout the drawings to reference like features and components.

DETAILED DESCRIPTION

Overview

Determining heights of objects at long ranges (e.g., distances or slant ranges) in autonomous-driving applications or driver-assistance applications can be difficult. Some radars determine heights of objects using an array of antennas with a plurality of antennas separated in an elevation direction. Often times, these radars use detection level data, e.g., radar data that passes a detection level threshold to determine an object's height. In particular, these radars can determine the object's height based on a peak amplitude within the detection level data. Sometimes, however, the peak amplitude can be influenced by noise sources within the environment. Additionally, reflections from objects at far ranges may not have sufficient amplitude to exceed the detection level threshold or be associated with the peak amplitude. Consequently, measuring the object's height from information (e.g., a range bin and an elevation bin) associated with the peak amplitude can produce an inaccurate height measurement. As a distance between the object and the radar decreases, the radar may be able to detect the object at short ranges and accurately determine the object's height. This short range detection, however, can make it challenging to perform an evasive maneuver, if necessary.

This document describes techniques and devices that implement height-estimation of objects using radar. In particular, a radar system, which is mounted to a moving platform, receives reflection signals that represent versions of a radar signal that are reflected by objects. The radar system generates a range-elevation map based on raw data from the reflection signals, identifies an elevation bin and a range bin in the range-elevation map that corresponds to an object, and calculates a height for the object based on the range and elevation bins. The radar system then calculates a de-noised height for the object based on one or more previously calculated heights for the object. In this way, the radar system can determine accurate heights of objects at long distances, and thus, determine if the vehicle can safely traverse underneath those objects or if corrective action is necessary.

Example Environment

Figure 1:
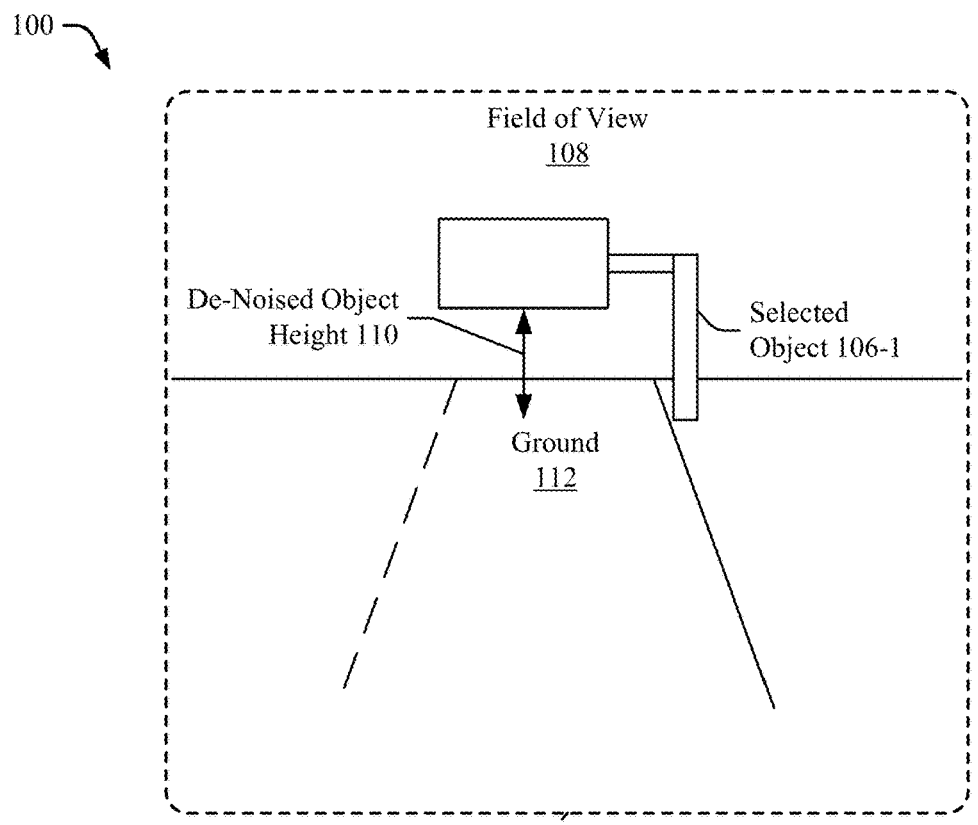
FIG. 1 illustrates an example environment in which a radar system capable of performing height-estimation of objects using radar can be implemented.
Figure 1:
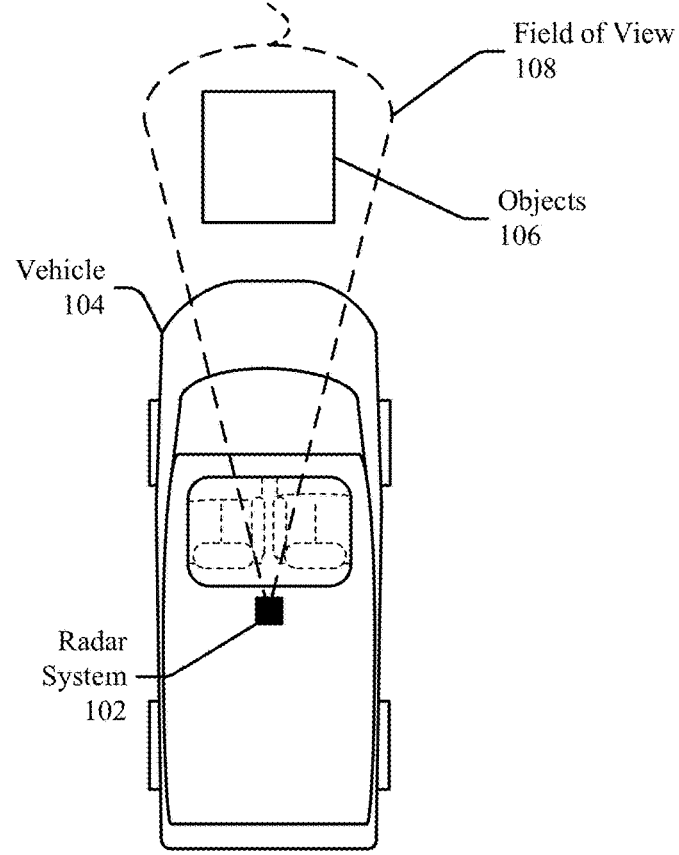

FIG. 1 is an illustration of an example environment 100 in which techniques using, and an apparatus including, a radar system 102 capable of performing height-estimation of objects using radar may be embodied. In the depicted environment 100, the radar system 102 is mounted to, or integrated within, a vehicle 104. The radar system 102 is capable of detecting one or more objects 106 that are within proximity to the vehicle 104. Although illustrated as a car, the vehicle 104 can represent other types of motorized vehicles (e.g., a motorcycle, a bus, a tractor, a semi-trailer truck, or construction equipment), types of non-motorized vehicles (e.g., a bicycle), types of railed vehicles (e.g., a train or a trolley car), watercraft (e.g., a boat or a ship), aircraft (e.g., an airplane or a helicopter), or spacecraft (e.g., satellite). In some cases, the vehicle 104 can tow, or include, a trailer or other attachments. In general, the radar system 102 can be mounted to any type of moving platform, including moving machinery or robotic equipment.

In the depicted implementation, the radar system 102 is mounted on top of the vehicle 104 and provides a field of view 108 illuminating the objects 106. In other implementations, the radar system 102 can be mounted to a front side, e.g. a bumper, a backside, a left side, or a right side of the vehicle 104. In some cases, the vehicle 104 includes multiple radar systems 102, such as a first front-mounted radar system 102 positioned near a left side of the vehicle 104 and a second front-mounted radar system 102 positioned near a right side of the vehicle 104. In general, locations of the one or more radar systems 102 can be designed to provide a particular field of view 108 that encompasses a region of interest in which the objects 106 may be present. Example fields of view 108 include a 360-degree field of view, one or more 180-degree fields of view, one or more 90-degree fields of view, and so forth, which can overlap (e.g., four 120-degree fields of view).

In general, the objects 106 are composed of one or more materials that reflect radar signals. Depending on the application, the objects 106 can represent targets of interest or clutter. In some cases, some of the objects 106 represent stationary objects, such as an overhead sign (shown as selected object 106-1). The system determines a height of the selected object 106-1 relative to the ground 112 at the selected object 106-1, e.g., a de-noised object height 110 of selected object 106-1. The radar system 102 and the vehicle 104 are further described with respect to FIG. 2, and the de-noised object height 110 is further described with respect to FIG. 3.

Example Device

Figure 2:
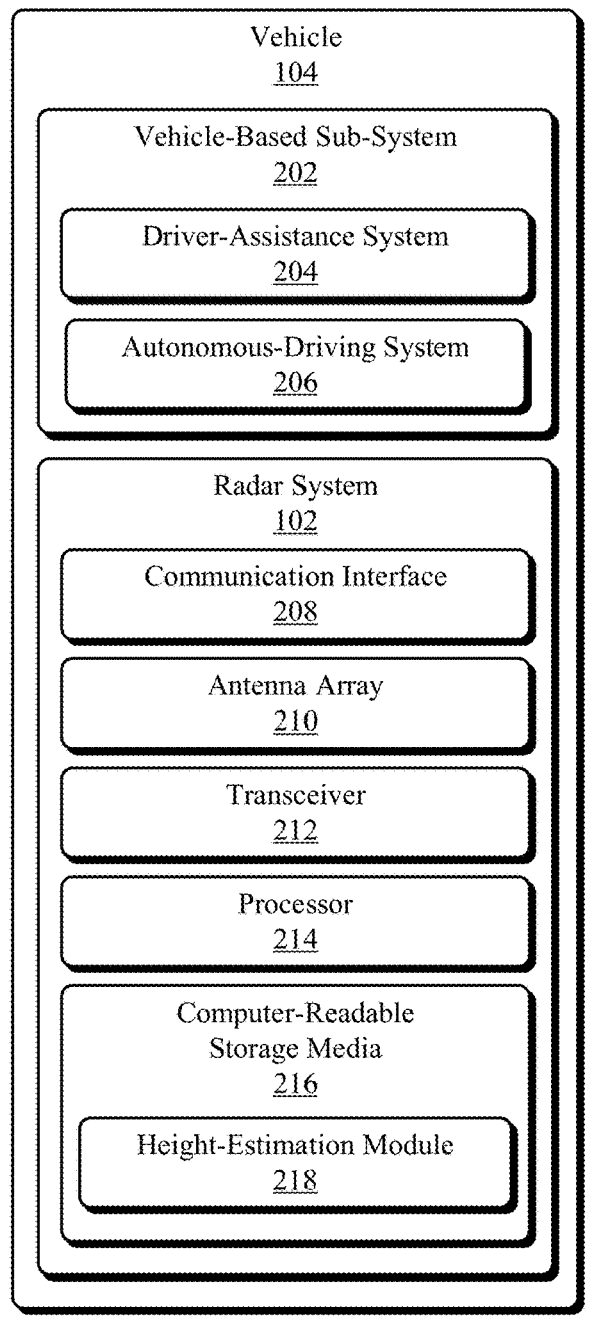
FIG. 2 illustrates an example implementation of a radar system as part of a vehicle.

FIG. 2 illustrates the radar system 102 as part of the vehicle 104. The vehicle 104 includes a vehicle-based sub-system 202, such as a driver-assistance system 204 and/or an autonomous-driving system 206. Generally, the radar-based system 202 uses radar data provided by the radar system 102 to perform a function. For example, the driver-assistance system 204 provides object height monitoring and generates an alert that indicates a potential collision with the selected object 106-1 that is detected by the radar system 102. In this case, the radar data from the radar system 102 indicates whether the object may be safely traveled under.

As another example, the driver-assistance system 204 suppresses alerts responsive to the radar system 102 indicating that the selected object 106-1 represents a moving object, such as another moving car, or that the selected object 106-1 is outside of a path of travel of the vehicle 104, such as a light post or sign post. In this way, the driver-assistance system 204 can avoid annoying the driver with alerts while the vehicle 104 is approaching objects that are ground mounted but have sufficient clearance underneath through which the vehicle can pass. By suppressing the alerts, these false detections will not cause the driver-assistance system 204 to alert the driver.

The autonomous-driving system 206 may move the vehicle 104 to a particular location while avoiding collisions with the selected object 106-1 detected by the radar system 102. The radar data provided by the radar system 102 can provide information about the location and movement of the other objects 106 to enable the autonomous-driving system 206 to perform emergency braking, perform a lane change, or adjust the vehicle 104's speed.

The radar system 102 includes a communication interface 208 to transmit the radar data to the radar-based system 202 or to another component of the vehicle 104 over a communication bus of the vehicle 104, for example, when the individual components shown in the radar system 102 are integrated within the vehicle 104. In general, the radar data provided by the communication interface 208 is in a format usable by the radar-based system 202. In some implementations, the communication interface 208 may provide information to the radar system 102, such as the speed of the vehicle 104 or whether a turning blinker is on or off. The radar system 102 can use this information to appropriately configure itself. For example, the radar system 102 can determine if the selected object 106-1 is stationary by comparing a Doppler for the selected object 106-1 to the speed of the vehicle 104. Alternatively, the radar system 102 can dynamically adjust the field of view 108 or in-lane azimuth angles based on whether a right-turning blinker or a left-turning blinker is on.

The radar system 102 also includes at least one antenna array 210 and at least one transceiver 212 to transmit and receive radar signals. The antenna array 210 includes at least one transmit antenna element and a plurality of receive antenna elements separated in azimuth and elevation directions. For example, the receive antenna elements may be part of an imaging radar array arranged in an 8×32 (elevation×azimuth) configuration. In some situations, the antenna array 210 also includes multiple transmit antenna elements to implement a multiple-input multiple-output (MIMO) radar capable of transmitting multiple distinct waveforms at a given time (e.g., a different waveform per transmit antenna element). The antenna elements can be circularly polarized, horizontally polarized, vertically polarized, or a combination thereof.

Using the antenna array 210, the radar system 102 can form beams that are steered or un-steered, and wide or narrow. The steering and shaping can be achieved through analog beamforming or digital beamforming. The one or more transmitting antenna elements can have, for instance, an un-steered omnidirectional radiation pattern or can produce a wide steerable beam to illuminate a large volume of space. To achieve target angular accuracies and angular resolutions, the receiving antenna elements can be used to generate hundreds of narrow steered beams with digital beamforming (described further below in relation to FIG. 4). In this way, the radar system 102 can efficiently monitor an external environment and detect one or more objects 108 within a region of interest.

The transceiver 212 includes circuitry and logic for transmitting and receiving radar signals via the antenna array 210. Components of the transceiver 212 can include amplifiers, mixers, switches, analog-to-digital converters, or filters for conditioning the radar signals. The transceiver 212 also includes logic to perform in-phase/quadrature (I/Q) operations, such as modulation or demodulation. A variety of modulations can be used, including linear frequency modulations, triangular frequency modulations, stepped frequency modulations, or phase modulations. The transceiver 212 can be configured to support continuous-wave or pulsed radar operations.

A frequency spectrum (e.g., range of frequencies) that the transceiver 212 uses to generate the radar signals can encompass frequencies between one and four hundred gigahertz (GHz), between four and one hundred GHz, or between approximately seventy and eighty GHz, for example. The bandwidths can be on the order of hundreds of megahertz or on the order of gigahertz.

The radar system 102 also includes one or more processors 214 and one or more non-transitory computer-readable storage media devices (CRM) 216. The CRM 216 includes a height-estimation module 218. The height-estimation module 218 can be implemented using hardware, software, firmware, or a combination thereof. In this example, the processor 214 implements the height-estimation module 218. Together, the height-estimation module 218 enable the processor 214 to process responses from the receive antenna elements in the antenna array 210 to detect the selected object 106-1 and generate the radar data for the radar-based system 202.

The height-estimation module 218 transforms raw data provided by the transceiver 212 into the de-noised object height 110 of the selected object 106-1. An operation of the height-estimation module 218 is further described with respect to FIG. 3.

The height-estimation module 218 produces data for the radar-based system 202. Example types of data include a Boolean value that indicates whether or not the vehicle 104 has clearance to drive under the selected object 106-1, whether or not the selected object 106-1 is present within a particular region of interest (e.g., in-lane or out of lane), a number that represents a characteristic of the selected object 106-1 (e.g., de-noised object height 110), or a value that indicates a type of the selected object 106-1 detected (e.g., overpass or sign).

Example Schemes

Figure 3:
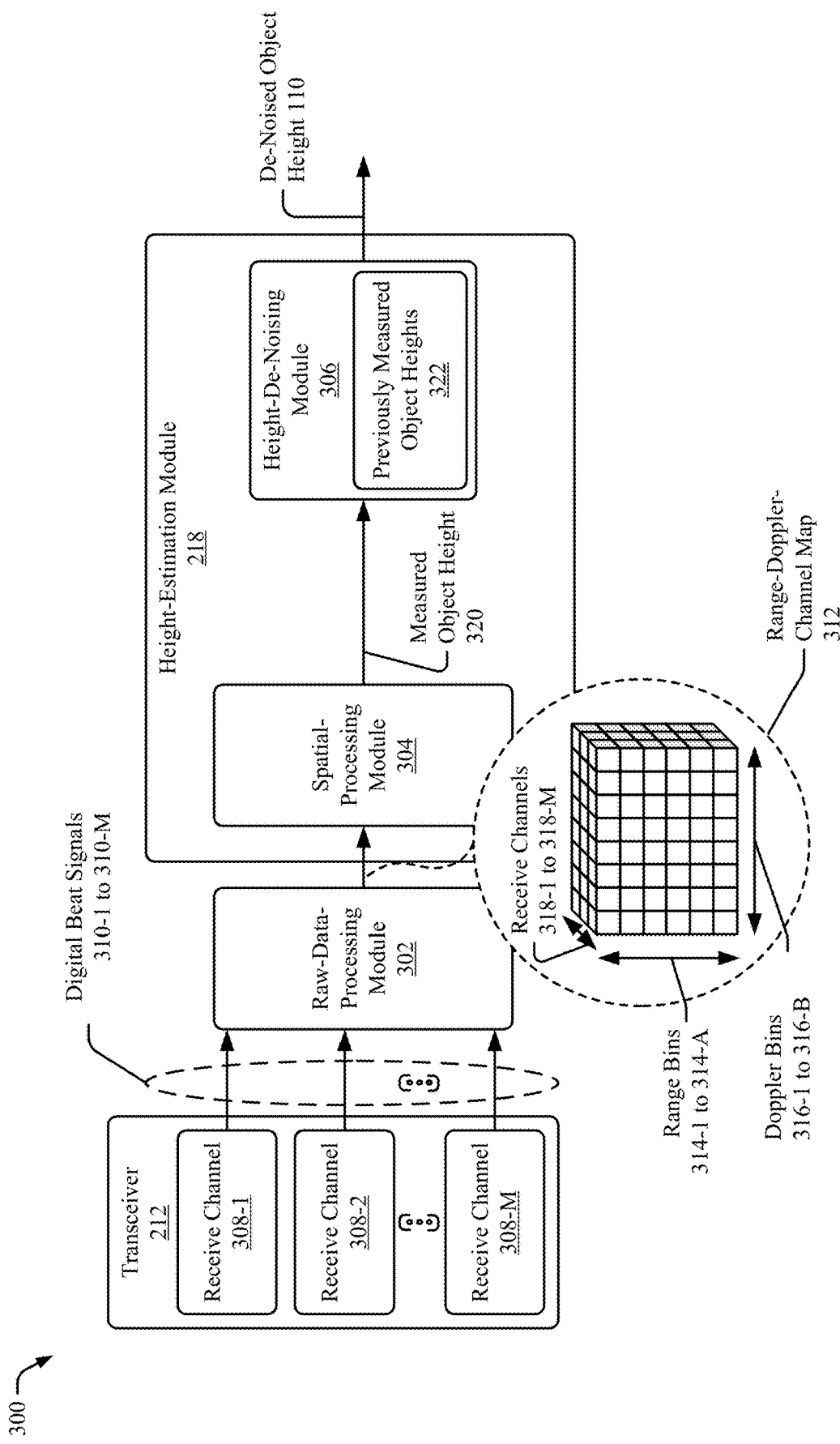
FIG. 3 illustrates an example scheme implemented by a processor of a radar system for performing height-estimation of objects using radar.

FIG. 3 illustrates an example scheme 300 implemented by the processor 214 of the radar system 102 for performing height-estimation of objects using radar for a radar frame. In the depicted configuration, the processor 214 implements a raw-data-processing module 302 and the height-estimation module 218, which includes a spatial-processing module 304 and a height-de-noising module 306. The processor 214 is connected to receive channels 308-1 to 308-M of the transceiver 212.

During reception, the raw-data-processing module 302 accepts digital beat signals 310-1 to 310-M from the receive channels 308-1 to 308-M. The digital beat signals 310-1 to 310-M represent raw or unprocessed complex radar data. The raw-data-processing module 302 performs one or more operations to generate a range-Doppler-channel map 312 based on the digital beat signals 310-1 to 310-M. As an example, the raw-data-processing module 302 can perform one or more Fourier transform operations, such as a Fast Fourier Transform (FFT) operation. Over time, the raw-data-processing module 302 generates multiple range-Doppler-channel maps 312 for respective frames of a radar receive signal.

The range-Doppler-channel map 312 includes amplitude and/or phase information (e.g., in-phase and quadrature components) associated with different range bins 314-1 to 314-A, Doppler bins 316-1 to 316-B, and receive channels 318-1 to 318-M, where A and B represent positive integers that may or may not be equal to each other. In other words, the range-Doppler-channel map 312 comprises multiple range-Doppler maps for each receive channel 318-1 to 318-M.

The spatial-processing module 304 receives the range-Doppler-channel map 312 for the radar frame and determines a measured object height 320 for an object with corresponding values in the range-Doppler-channel map 312. Unlike traditional radar systems, the spatial-processing module receives low-level radar data, e.g., data that has not passed through a detection-level filter. An example of such a filter uses a constant-false-alarm-rate (CFAR) threshold to separate objects from noise. By not using such a filter, the spatial-processing module 304 can extract details about objects that would ordinarily not be available due to low reflection intensities being below the CFAR threshold. Operation of the spatial-processing module 304 is further described with respect to FIG. 4.

The height-de-noising module 306 receives the measured object height 320 and uses the measured object height 320 along with one or more previously measured object heights 322 that are stored by the height-de-noising module 306 to calculate the de-noised object height 110. The previously measured object heights 322 are determined similarly to the measured object height 320 (described below in regard to FIG. 4), but for previous radar frames. The height-de-noising module 306 may calculate the de-noised object height 110 by applying a window average, weighted average, moving average, Kalman filtering, least square estimation, or any other averaging or de-noising technique using the previously measured object heights 322 for the previous radar frames and the measured object height 320 for the current radar frame. Furthermore, the height-de-noising module 306 may also compensate for a determined speed of the vehicle, e.g., use a different averaging technique, add/subtract height values, change a window size or weight, or apply different standard deviations based on the vehicle speed. For example, at a certain speed, the de-noised object height 110 may always be low, and thus, at that certain speed, the height-de-noising module 306 may add a value to the calculated de-noised object height 110 to compensate.

In this way, the height-de-noising module 306 is able to compensate for noisy, erratic, and/or inaccurate measured object heights 320 that are determined from the low-level radar data. For example, the low-level radar data, at farther ranges, has less signal-to-noise. This, in addition to operating in multipath environments and using a limited number of antennas in the elevation direction, can lead to inaccurate height measurements. Determining object heights at closer ranges may improve height accuracy, however, as discussed above, those closer ranges may not be sufficient for evasive action.

Figure 4:
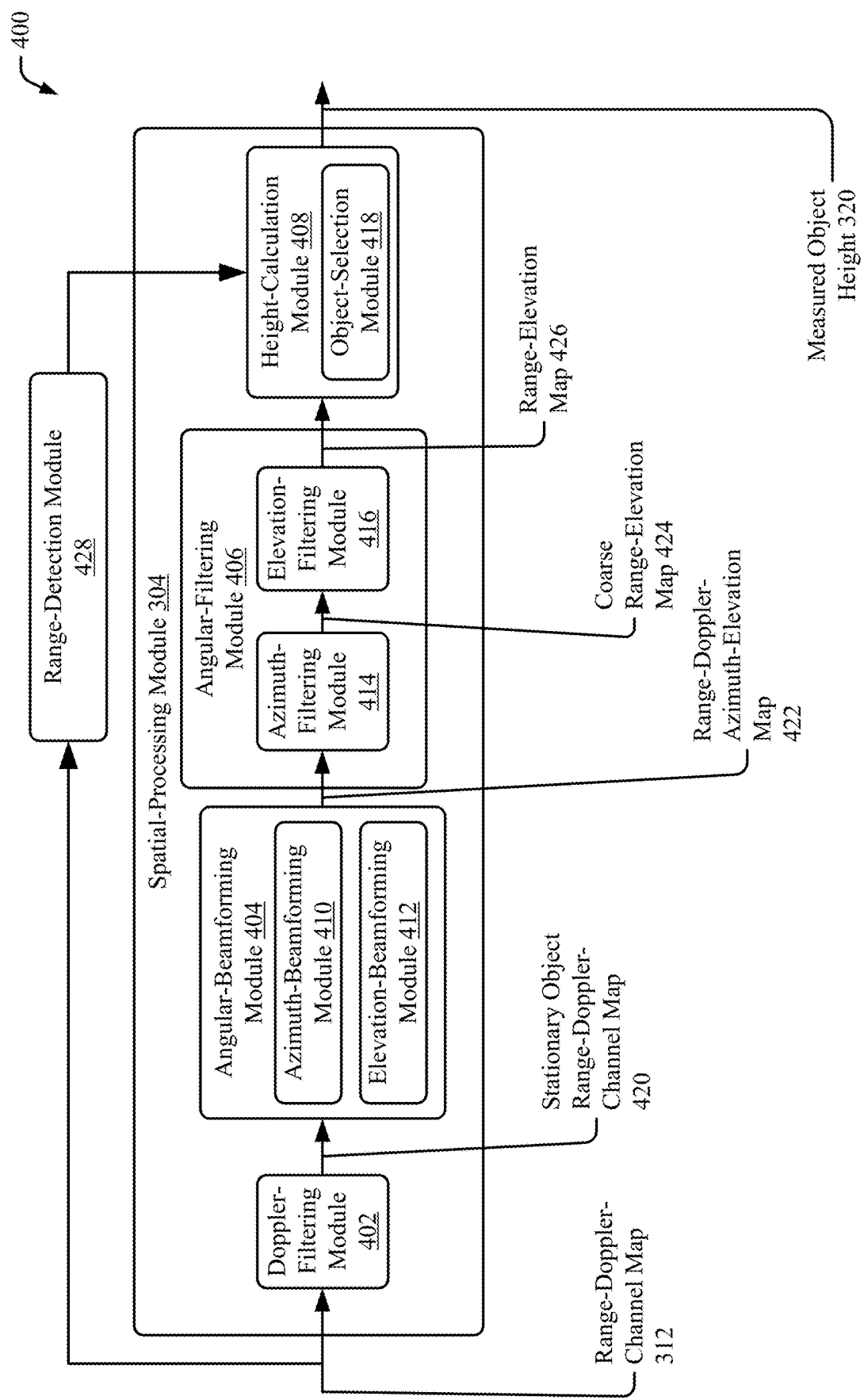
FIG. 4 illustrates an example scheme performed by a spatial-processing module of a radar system.

FIG. 4 illustrates an example scheme 400 implemented by the spatial-processing module 304. In the depicted configuration, the spatial-processing module 304 includes a Doppler-filtering module 402, an angular-beamforming module 404, an angular-filtering module 406, and a height-calculation module 408. The angular-beamforming module 404 can include an azimuth-beamforming module 410 and an elevation-beamforming module 412. The angular-filtering module 406 includes an azimuth-filtering module 414 and an elevation-filtering module 416. The height-calculation module 408 includes an object-selection module 418.

During operation, the Doppler-filtering module 402 determines a Doppler bin within Doppler bins 316 in the range-Doppler-channel Map 312 that corresponds to stationary objects. For example, the Doppler-filtering module 402 identifies a Doppler bin that is associated with the vehicle 104's speed. The vehicle speed may be calculated or received from the vehicle 104. In this case, objects that appear within this Doppler bin are likely to be stationary objects. The Doppler-filtering module 402 can also consider other Doppler bins that are on either side of this Doppler bin as stationary Doppler bins to enable detections of stationary objects that may have some motion, such as due to wind, or to account for inaccuracies in vehicle speed determination. Information within other Doppler bins that do not correlate with the selected Doppler/vehicle speed are removed from the range-Doppler-channel map 312 After the selected Doppler bins have been isolated, the Doppler-filtering module 402 outputs a stationary object range-Doppler channel map 420. By filtering by Doppler, the Doppler-filtering module 402 is able to reduce the amount of data for further processing by the other modules of the height-estimation module 218.

The angular-beamforming module 404 receives the stationary object range-Doppler-channel map 420 and performs digital beamforming on the stationary object range-Doppler-channel map 420 to produce a range-Doppler-azimuth-elevation map 422 for the stationary Doppler bins. The azimuth-beamforming module 410 looks at channel data from radar sensors disposed in the azimuth direction in order to determine the azimuth bins for the range-Doppler-azimuth-elevation map 422. The elevation-beamforming module 412 looks at channel data from radar sensors disposed in the elevation direction in order to determine the elevation bins of the range-Doppler-azimuth-elevation map 422. The beamforming performed by the azimuth-beamforming module 410 and/or the elevation-beamforming module 412 may comprise applying a super-resolution algorithm or adaptive beamforming algorithm, such as an iterative adaptive approach (IAA), Capon or multiple signal classification (MUSIC) algorithm. The beamforming may also be performed using a conventional beamforming algorithm, such as a Bartlett algorithm Regardless of how the beamforming is performed, the angular-beamforming module 404 outputs the range-Doppler-azimuth-elevation map 422 that contains range, Doppler, azimuth, and elevation data for stationary objects within the radar system's field of view.

The azimuth-filtering module 414 receives the range-Doppler-azimuth-elevation map 422 and outputs a coarse range-elevation map 424 corresponding to in-lane objects. For example, the azimuth-filtering module 414 may determine a fixed set of azimuth bins that correspond to a width of the lane and use those azimuth bins to filter the range-Doppler-azimuth-elevation map 422. In some embodiments, the azimuth-filtering module 414 may determine in-lane azimuth bins for a plurality of ranges to compensate for perspective, (e.g., in-lane azimuth angles diminish as range increases from the perspective of the radar system) and use those varying azimuth bins for the filtering. Furthermore, as the mobile platform may change location relative to the lane, lane tracking may be used to further determine in-lane azimuth bins (with or without varying azimuth bins relative to range). Once the range-Doppler-azimuth-elevation map 422 has been filtered, it becomes the coarse range-elevation map 424. In other words, the coarse range-elevation map 424 is the range-Doppler-azimuth-elevation map 422 from the perspective of all stationary Doppler bins and in-lane azimuth bins. In this way, the azimuth-filtering module 414 is able to further reduce data processing loads in other modules, (e.g., elevation-filtering module 416 and height-calculation module 408) while also decoupling out of lane objects (e.g., posts that support a sign) from in-lane objects (e.g., the sign itself).

The elevation-filtering module 416 receives the coarse range-elevation map 424 and performs a signal filtering operation. The signal filtering operation may be a principle component analysis algorithm, such as a whitening algorithm Regardless of what algorithm is used for the filtering, an enhanced signal-to-noise (relative to the coarse range-elevation map 424) range-elevation map 426 is created for the objects that are both stationary and in-lane. By doing so, the elevation-filtering module 416 is able to increase an accuracy of the information within the range-elevation map 426, which leads to increased accuracy of object selection by the object-selection module 418 and object height calculation by the height-calculation module 408.

The object-selection module 418 determines at least one object at a specific range, e.g., selected object 106-1, and generates an energy spectrum along elevation angles for the selected object 106-1. The elevation angle with the highest energy is selected as the elevation angle of the selected object 106-1. The specific range for the selected object 106-1 may be determined from the range data in the range-elevation map 426 or may be received from an external source, such as from a range-detection module 428 that determines accurate ranges of objects based on high-level data extracted from the range-Doppler-channel map 312. The height-calculation module 408 then calculates the measured object height 320 for the selected object 106-1 in the range-elevation map 426 using a sine operation (height=range[sin(elevation angle)]). The measured object height 320 is then used to calculate the de-noised object height 110 as discussed in regard to FIG. 3.

The order of operations described above in regard to the spatial-processing module 304 are only illustrative of one implementation. Operations performed by the Doppler-filtering module 402, the azimuth-beamforming module 410, the elevation-beamforming module 412, the azimuth-filtering module 414, and the elevation-filtering module 416 may be performed in different orders relative to each other without departing from the scope of the disclosure. For example, Doppler filtering by the Doppler-filtering module 402 may be performed after beamforming (either by the azimuth-beamforming module 410 or elevation-beamforming module 412). Furthermore, azimuth filtering by the azimuth-filtering module 414 may be performed prior to elevation beamforming by the elevation-beamforming module 416, e.g., beamforming does not need to be performed in both azimuth and elevation directions in the same operation.

Some of the modules described within the spatial-processing module 304, e.g., the Doppler-filtering module 402, the azimuth-beamforming module 410, the azimuth-filtering module 414, and the elevation-filtering module 416, are optional. These optional modules are provided to improve the accuracy of the measured object height 320 and/or to reduce data loads for improving processing speeds of one or more downstream operations.

Example Methods

The following methods are shown as sets of operations (or acts) performed but not necessarily limited to the order or combinations in which the operations are shown herein. Further, any of one or more of the operations may be repeated, combined, or reorganized to provide other methods. In portions of the following discussion, reference may be made to entities detailed in FIGS. 1-4, reference to which is made for example only. The techniques are not limited to performance by one entity or multiple entities.

Figure 5:
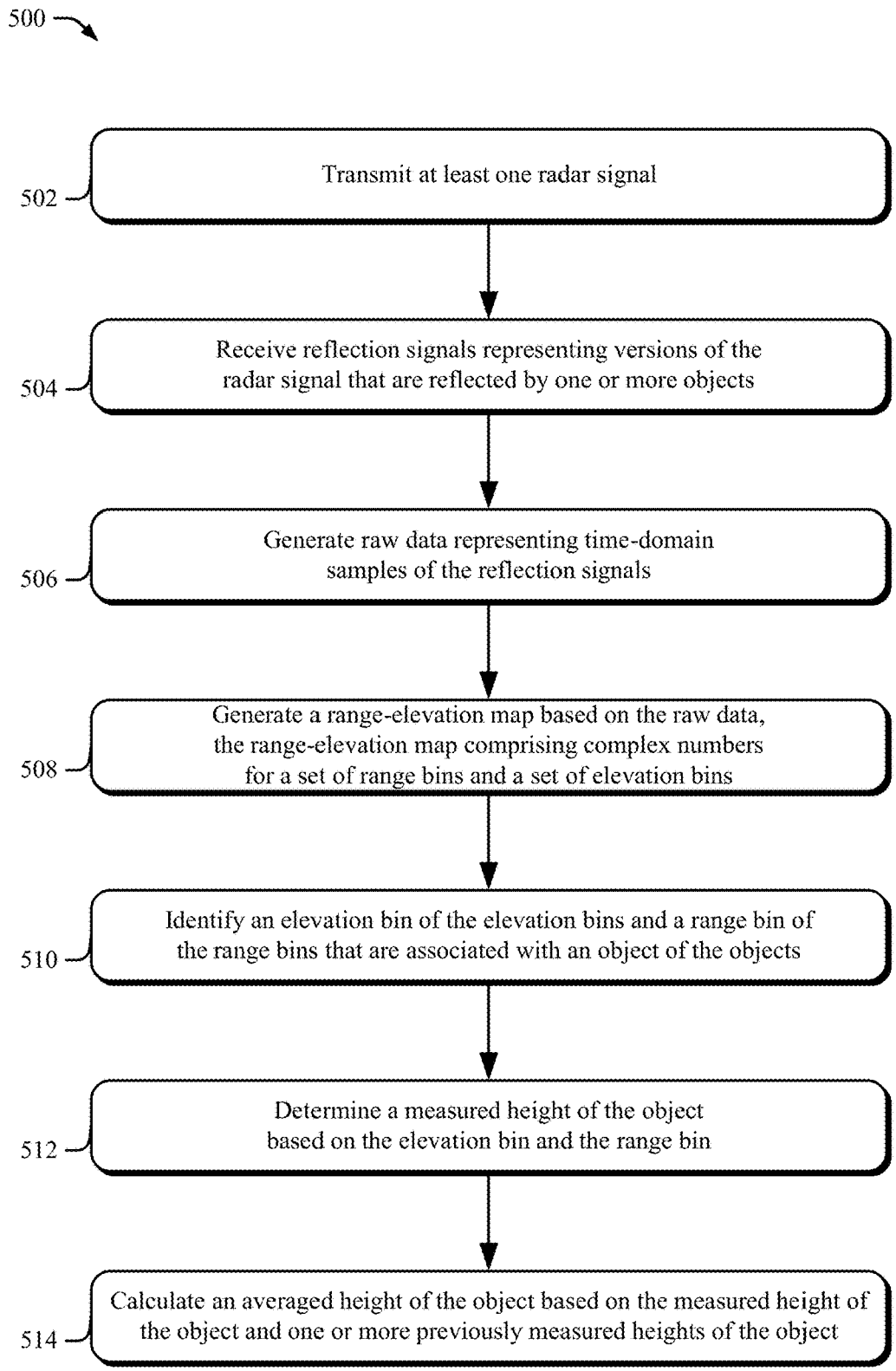
FIG. 5 illustrates an example method of a radar system for performing height-estimation of objects using radar.

FIG. 5 depicts an example method 500 for performing height-estimation of objects using radar.

At 502, one or more antennas of a radar system, e.g., an antenna of array 210 or another antenna of radar system 102, transmits at least one radar signal.

At 504, reflection signals representing versions of the radar signal that are reflected or have been reflected by one or more objects that are within a field of view of the radar system are received by a plurality of antennas of the radar system, e.g., by array 210. The reflection signals are received as channel data that corresponds to each of the respective antennas. The radar system generally knows locations of the antennas in both the azimuth and elevation directions in order to perform the operations below.

At 506, the radar system generates raw data representing time-domain samples of the reflection signals. For example, the raw data may comprise digital beat signals 310-1 to 310-M.

At 508, a range-elevation map is generated based on the raw data. The range-elevation map has complex numbers for a set of range bins and a set of elevation bins. The above disclosure provides a number of ways to get to a range-elevation map, e.g., range-elevation map 426, from the raw data. One such example is described in regard to FIG. 6 below. The low-level raw data is used to determine the range-elevation map. That is, no detection-level threshold is used on the raw data or any intermediate steps. This enables the radar system to capture height information at larger distances, e.g. beyond 200 meters.

At 510, an elevation bin of the elevation bins and a range bin of the range bins that are associated with a selected object of the objects is identified. As discussed above, the range may be determined directly form the range-elevation map, or may be received from a separate module, e.g., range-detection module 428. Regardless of how the range bin is identified, the elevation bin is selected as having a highest energy at the identified range.

At 512, the radar system determines a measured height of the selected object based on the elevation bin and the range bin. As discussed above, a sine operation is used to calculate the height of the selected object based on the range and elevation angle of the selected object.

At 514, a de-noised height of the selected object is calculated based on the measured height of the selected object and one or more previously measured heights of the selected object.

Figure 6:
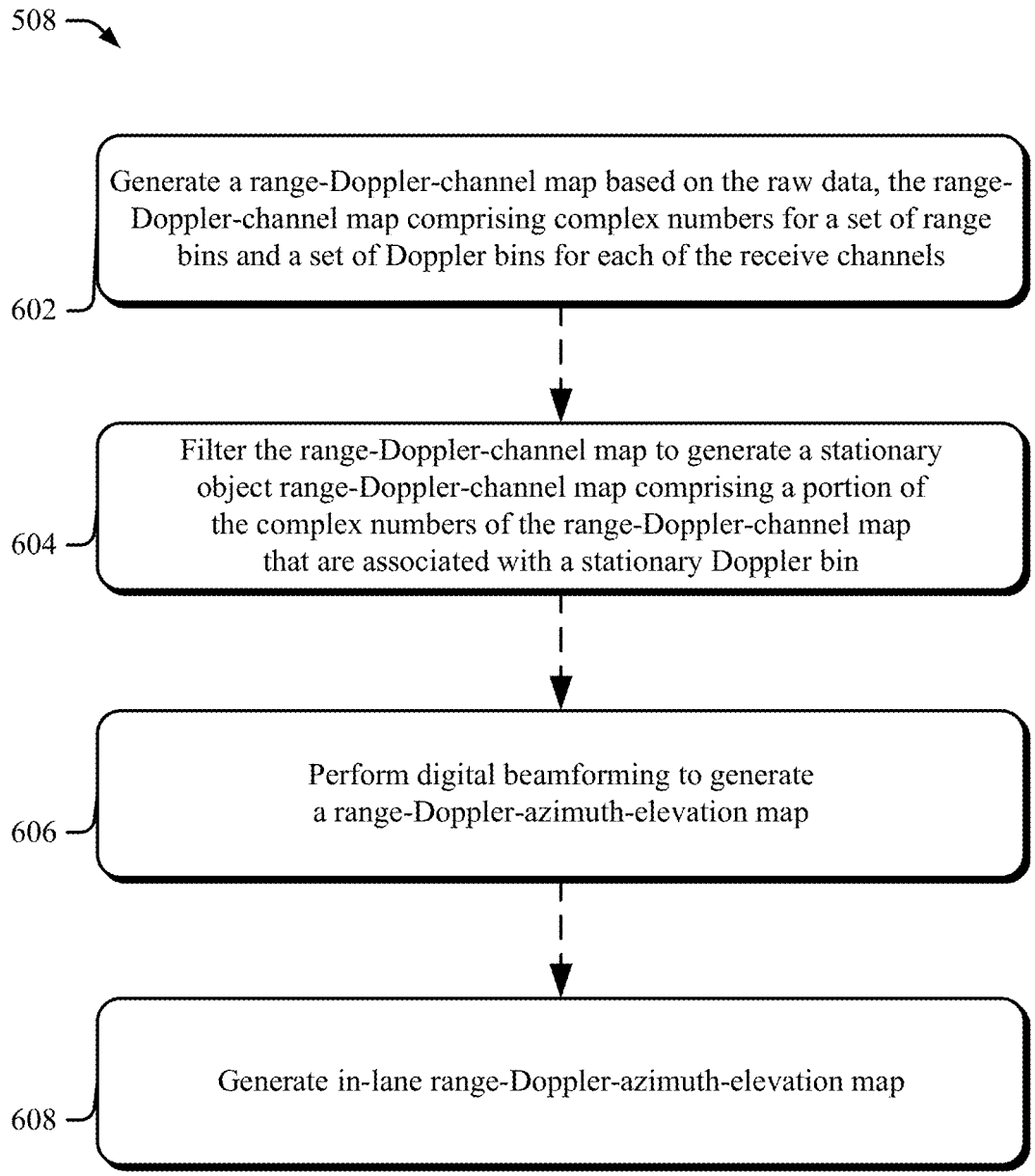
FIG. 6 illustrates an example method of a radar system for generating a range-elevation map.

FIG. 6 depicts an example method of step 508 for generating a range-elevation map based on raw data. The operations described below are generally optional steps comprised by step 508 of FIG. 5 to improve the operation of the radar system.

At 602, the radar system generates a range-Doppler-channel map, e.g., range-Doppler-channel map 312, based on the raw data, e.g., digital beat signals 310-1 to 310-M. The range-Doppler-channel map contains complex numbers for a set of range bins and set of Doppler bins for each of the receive channels.

At 604, the range-Doppler-channel map is filtered to generate a stationary object range-Doppler-channel map, e.g., stationary object range-Doppler-channel map 420, that comprises a portion of the complex numbers of the range-Doppler-channel map that are associated with a stationary object Doppler bin. The stationary object Doppler bin may correspond to a speed of the vehicle/mobile platform at a time the radar frame is received. The vehicle speed may be received/pulled from another module, sensor, or component of the vehicle, e.g., a speedometer of the vehicle. Furthermore, the range-Doppler-channel map may be filtered according to a small range of Doppler bins surrounding the Doppler bin to account for speed inaccuracy and/or minor movement of the stationary objects At 606, digital beamforming is performed on the stationary object range-Doppler-channel map to generate a range-Doppler-azimuth-elevation map, e.g., range-Doppler-azimuth-elevation map 422. The beamforming may be conventional or adaptive and performed in one or more of an elevation or azimuth direction.

At 608, the radar system filters the range-Doppler-azimuth-elevation map in the azimuth direction to generate an in-lane range-Doppler-azimuth-elevation map, e.g., coarse range-elevation map 424. The filtering is based on azimuth bins corresponding to in-lane azimuth angles that vary with range. For example, a narrower set of azimuth bins may be selected for longer range bins and a wider set of azimuth bins may be selected for shorter range bins.

Although not shown in FIG. 6, elevation filtering may also be performed, e.g., to produce range-elevation map 426 from coarse range-elevation map 424. As discussed above, elevation filtering is used to increase a signal-to-noise ratio of the range-elevation map. The output of 608 is the range-elevation map from step 508 that corresponds to stationary in-lane objects.

EXAMPLES

Some examples are described below.

Example 1

A method performed by a radar system that is mounted to a mobile platform, the method comprising: transmitting, by the radar system, at least one radar signal; receiving, by the radar system, reflection signals representing versions of the at least one radar signal that have been reflected by one or more objects; generating, by multiple receive channels of the radar system, raw data representing time-domain samples of the reflection signals; generating, by a height-estimation module of the radar system, a range-elevation map based on the raw data, the range-elevation map comprising complex numbers for a set of range bins and a set of elevation bins; identifying, within the range-elevation map, an elevation bin of the elevation bins and a range bin of the range bins that are associated with an object of the objects; determining, by the height-estimation module, a measured height of the object based on the elevation bin and the range bin; and calculating a de-noised height of the object based on the measured height of the object and one or more previously measured heights of the object.

Example 2

The method of example 1, wherein at least one elevation bin or range bin within the range-elevation map has an amplitude greater than zero but less than a detection-level threshold.

Example 3

The method of example 1, wherein the calculating the de-noised height of the object comprises applying one or more of a window average, a running average, or a weighted average of the measured height of the object and the previously measured heights of the object.

Example 4

The method of example 1, wherein the generating the range-elevation map comprises applying at least one of a whitening or denoising algorithm on a previously generated coarse range-elevation map.

Example 5

The method of example 1, further comprising: generating, prior to generating the range-elevation map, a range-doppler-channel map comprising complex numbers for a set of range bins and a set of Doppler bins for each of the receive channels based on the raw data; and filtering the range-doppler-channel map to generate a stationary object range-doppler-channel map comprising a portion of the complex numbers of the range-doppler-channel map that are associated with a set of stationary Doppler bins, wherein the range-elevation map is based on the stationary object range-doppler-channel map.

Example 6

The method of example 5, wherein the set of stationary Doppler bins corresponds to a velocity of the mobile platform.

Example 7

The method of example 1, further comprising: performing, prior to generating the range-elevation map, digital beamforming to generate a range-Doppler-azimuth-elevation map based on the raw data, wherein: the generating the range-elevation map is further based on the range-Doppler-azimuth-elevation map; and the generating the range-elevation map from the range-Doppler-azimuth-elevation map comprises generating an in-lane range-Doppler-azimuth-elevation map that includes azimuth bins associated with in-lane azimuth angles.

Example 8

The method of example 7, wherein the performing the digital beamforming comprises applying an adaptive beamforming algorithm to generate the range-Doppler-azimuth-elevation map.

Example 9

A radar system comprising: an array of receive antennas; a transceiver coupled to the array of receive antennas, the transceiver configured to receive reflection signals from the array of receive antennas representing versions of a radar signal that are reflected by one or more objects; and a processor coupled to the transceiver, the processor configured to: generate from multiple receive channels of the radar system corresponding to respective receive antennas of the array of receive antennas, raw data representing time-domain samples of the reflection signals; generate a range-elevation map based on the raw data, the range-elevation map comprising complex numbers for a set of range bins and a set of elevation bins; identify, within the range-elevation map, an elevation bin of the elevation bins and a range bin of the range bins that are associated with an object of the objects; determine a measured height of the object based on the elevation bin and the range bin; and calculate an de-noised height of the object based on the measured height of the object and one or more previously measured heights of the object.

Example 10

The radar system of example 9, wherein at least one cell within the range-elevation map has an amplitude greater than zero but less than a detection-level threshold.

Example 11

The radar system of example 9, wherein the calculating the de-noised height of the object comprises applying one or more of a window average, a running average, or a weighted average of the measured height of the object and the previously measured heights of the object.

Example 12

The radar system of example 9, wherein the processor is further configured to determine whether the object can be safely traveled under based on the de-noised height of the object.

Example 13

The radar system of example 9, wherein the processor is further configured to: generate, prior to generating the range-elevation map, a range-Doppler-Channel map comprising complex numbers for a set of range bins and a set of Doppler bins for each of the receive channels based on the raw data; and filter the range-Doppler-Channel map to generate a stationary object range-Doppler-Channel map comprising a portion of the complex numbers of the range-Doppler-Channel map that are associated with a set of stationary Doppler bins, wherein the range-elevation map is based on the stationary object range-Doppler-Channel map.

Example 14

The radar system of example 9, wherein the processor is further configured to: perform, prior to generating the range-elevation map, digital beamforming to generate a range-Doppler-azimuth-elevation map based on the raw data, wherein: the generating the range-elevation map is further based on the range-Doppler-azimuth-elevation map; and the generating the range-elevation map from the range-Doppler-azimuth-elevation map comprises generating an in-lane range-Doppler-azimuth-elevation map that includes azimuth bins associated with in-lane azimuth angles.

Example 15

At least one non-transitory computer-readable storage media device comprising computer-executable instructions that, responsive to execution by at least one processor, implement: a height-estimation module configured to: receive, from multiple receive channels of a radar system, raw data representing time-domain samples of reflection signals representing versions of a radar signal that have been reflected by one or more objects; generate a range-elevation map comprising complex numbers for a set of range bins and a set of elevation bins based on the raw data; identify an elevation bin of the elevation bins and a range bin of the range bins that are associated with an object of the objects; determine a measured height of the object based on the elevation bin and the range bin; and calculate an de-noised height of the object based on the measured height of the object and one or more previously measured heights of the object.

Example 16

The non-transitory computer-readable storage media devices of example 15, wherein at least one cell within the range-elevation map has an amplitude greater than zero but less than a detection-level threshold.

Example 17

The non-transitory computer-readable storage media devices of example 15, wherein the calculating the de-noised height of the object comprises applying one or more of a window average, a running average, or a weighted average of the measured height of the object and the previously measured heights of the object.

Example 18

The non-transitory computer-readable storage media devices of example 15, wherein the computer-executable instructions further implement: a raw-data-processing module configured to generate a range-Doppler-Channel map comprising complex numbers for a set of range bins and a set of Doppler bins for each of the receive channels based on the raw data; and a Doppler-filtering module configured to filter the range-Doppler-Channel map to generate a stationary object range-Doppler-Channel map comprising a portion of the complex numbers of the range-Doppler-Channel map that are associated with a set of stationary Doppler bins, wherein the range-elevation map is based on the stationary object range-Doppler-Channel map.

Example 19

The non-transitory computer-readable storage media devices of example 18, wherein the computer-executable instructions further implement: an angular-beamforming module configured to perform digital beamforming to generate a range-Doppler-azimuth-elevation map based on the raw data, wherein: the generating the range-elevation map is further based on the range-Doppler-azimuth-elevation map; and the generating the range-elevation map from the range-Doppler-azimuth-elevation map comprises generating an in-lane range-Doppler-azimuth-elevation map that includes azimuth bins associated with in-lane azimuth angles.

Example 20

The non-transitory computer-readable storage media devices of example 15, wherein the height-estimation module is further configured to determine whether the object can be safely traveled under based on the de-noised height of the object.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims.

What is claimed:

1. A method performed by a radar system that is mounted to a mobile platform, the method comprising:
    transmitting, by the radar system, at least one radar signal;
    receiving, by the radar system, reflection signals representing versions of the at least one radar signal that have been reflected by one or more objects;
    generating, by multiple receive channels of the radar system, raw data representing time-domain samples of the reflection signals for a current frame;
    generating, a range-doppler-channel map comprising complex numbers for a set of range bins and a set of Doppler bins for each of the receive channels based on the raw data;
    filtering the range-doppler-channel map to generate a stationary object range-doppler-channel map comprising a portion of the complex numbers of the range-doppler-channel map that are associated with a set of stationary Doppler bins;
    performing digital beamforming to generate a range-Doppler-azimuth-elevation map based on the stationary object range-doppler-channel map;

filtering the range-doppler-azimuth-elevation map to generate a range-elevation map comprising a portion of the complex numbers of the range-doppler-azimuth-elevation map that are associated with in-lane azimuth angle bins;

identifying, within the range-elevation map, range bin associated with a selected object of the one or more objects, the selected object being at a range effective to cause a reflection signal caused by the selected object to have an amplitude similar to that of noise sources;

generating an energy spectrum along elevation bins for the selected object based on the complex numbers of the elevation bins corresponding to the range bin;

determining, by the radar system, a measured height of the selected object based on which of the elevation bins has a highest energy; and calculating a height of the selected object based on the measured height of the selected object and one or more previously measured heights of the selected object, at least one of the elevation bins or the range bins used to determine the height having an amplitude greater than zero and less than a detection-level threshold.

2. The method of claim 1, wherein the calculating the height of the selected object comprises applying one or more of a Kalman filter, a least square estimate, a window average, a running average, or a weighted average of the measured height of the selected object and the previously measured heights of the selected object.

3. The method of claim 1, wherein the generating the range-elevation map comprises applying at least one of a whitening or denoising algorithm on a previously generated coarse range-elevation map.

4. The method of claim 1, wherein the set of stationary Doppler bins corresponds to a velocity of the mobile platform.

5. The method of claim 1, wherein the performing the digital beamforming comprises applying an adaptive beamforming algorithm to generate the range-Doppler-azimuth-elevation map.

6. The method of claim 1, wherein the detection-level threshold corresponds to a detection level usable to separate moving and non-moving objects from noise.

7. The method of claim 1, further comprising performing a vehicle function based on the calculated height.

8. The method of claim 7, wherein the vehicle function is a determination of an under drivable situation with the selected object.

9. A radar system comprising:
a processor coupled to a transceiver,
the transceiver coupled to an array of receive antennas, the transceiver configured to receive reflection signals from the array of receive antennas representing versions of a radar signal that are reflected by one or more objects;
the processor configured to:
generate from multiple receive channels of the radar system corresponding to respective receive antennas of the array of receive antennas, raw data representing time-domain samples of the reflection signals;
generate, a range-doppler-channel map comprising complex numbers for a set of range bins and a set of Doppler bins for each of the receive channels based on the raw data;
filter the range-doppler-channel map to generate a stationary object range-doppler-channel map comprising a portion of the complex numbers of the range-doppler-channel map that are associated with a set of stationary Doppler bins;
perform digital beamforming to generate a range-Doppler-azimuth-elevation map based on the stationary object range-doppler-channel map;
filter the range-doppler-azimuth-elevation map to generate a range-elevation map comprising a portion of the complex numbers of the range-doppler-azimuth-elevation map that are associated with in-lane azimuth angle bins;
identify, within the range-elevation map, range bin associated with a selected object of the one or more objects, the selected object being at a range effective to cause a reflection signal caused by the selected object to have an amplitude similar to that of noise sources;
generate an energy spectrum along elevation bins for the selected object based on the complex numbers of the elevation bins corresponding to the range bin;
determine a measured height of the selected object based on which of the elevation bins has a highest energy; and
calculate a height of the selected object based on the measured height of the selected object and one or more previously measured heights of the selected object without using a detection-level threshold.

10. The radar system of claim 9, wherein the calculating the height of the selected object comprises applying one or more of a Kalman filter, a least square estimate, a window average, a running average, or a weighted average of the measured height of the selected object and the previously measured heights of the selected object.

11. The radar system of claim 9, wherein the processor is further configured to determine whether the selected object can be traveled under by a mobile platform based on the height of the selected object.

12. The radar system of claim 9, wherein the detection-level threshold corresponds to a detection level usable to separate objects from noise.

13. The radar system of claim 9, wherein the processor is further configured to perform a vehicle function based on the calculated height.

14. The radar system of claim 13, wherein the vehicle function is a determination of an under drivable situation with the selected object.

15. A non-transitory computer-readable storage media device comprising computer-executable instructions that, when executed, cause at least one processor to:
receive, from multiple receive channels of a radar system, raw data representing time-domain samples of reflection signals representing versions of a radar signal that have been reflected by one or more objects for a current frame;
generate, a range-doppler-channel map comprising complex numbers for a set of range bins and a set of Doppler bins for each of the receive channels based on the raw data;
filter the range-doppler-channel map to generate a stationary object range-doppler-channel map comprising a portion of the complex numbers of the range-doppler-channel map that are associated with a set of stationary Doppler bins;
perform digital beamforming to generate a range-Doppler-azimuth-elevation map based on the stationary object range-doppler-channel map;
filter the range-doppler-azimuth-elevation map to generate a range-elevation map comprising a portion of the complex numbers of the range-doppler-azimuth-elevation map that are associated with in-lane azimuth angle bins;

identify range bin associated with a selected object of the one or more objects, the selected object being at a range effective to cause a reflection signal caused by the selected object to have an amplitude similar to that of noise sources;

generate an energy spectrum along elevation bins for the selected object based on the complex numbers of the elevation bins corresponding to the range bin;

determine a measured height of the selected object based on the elevation bin and the range bin; and calculate a height of the selected object based on the measured height of the selected object and one or more previously measured heights of the selected object.

16. The non-transitory computer-readable storage media device of claim 15, wherein the computer-executable instructions cause the at least one processor to calculate the height of the selected object by applying one or more of a Kalman filter, a least square estimate, a window average, a running average, or a weighted average of the measured height of the selected object and the previously measured heights of the selected object.

17. The non-transitory computer-readable storage media device of claim 15, wherein the computer-executable instructions further cause the at least one processor to determine whether the selected object can be traveled under by a mobile platform based on the height of the selected object.

18. The non-transitory computer-readable storage media device of claim 15, wherein the detection-level threshold corresponds to a detection level usable to separate objects from noise.

19. The non-transitory computer-readable storage media device of claim 15, wherein the instructions further cause the processor to perform a vehicle function based on the calculated height.

20. The non-transitory computer-readable storage media device of claim 19, wherein the vehicle function is a determination of an under drivable situation with the selected object.

* * * * *